(12) United States Patent
Dry et al.

(10) Patent No.: US 10,773,612 B2
(45) Date of Patent: Sep. 15, 2020

(54) NETWORK OF RAILS FOR A VEHICLE

(71) Applicant: Ford Global Technologies, LLC, Dearborn, MI (US)

(72) Inventors: Alan George Dry, Grosse Pointe Woods, MI (US); Johnathan Andrew Line, Northville, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 16/204,272

(22) Filed: Nov. 29, 2018

(65) Prior Publication Data

US 2020/0171983 A1 Jun. 4, 2020

(51) Int. Cl.
*B60N 2/02* (2006.01)
*B60N 2/07* (2006.01)
*B60N 2/01* (2006.01)
*B60N 2/14* (2006.01)
*B60N 2/06* (2006.01)

(52) U.S. Cl.
CPC ............. *B60N 2/0735* (2013.01); *B60N 2/01* (2013.01); *B60N 2/062* (2013.01); *B60N 2/0732* (2013.01); *B60N 2/14* (2013.01)

(58) Field of Classification Search
CPC .... B60N 2/062; B60N 2/0715; B60N 2/0705; B60N 2/1803; B60N 2/06; B62D 25/06; B60J 7/047; B60L 2200/26; A63H 19/30
See application file for complete search history.

(56) References Cited

U.S. PATENT DOCUMENTS

| | | | |
|---|---|---|---|
| 2,426,582 A | 9/1947 | Austin | |
| 4,341,415 A | 7/1982 | Braun et al. | |
| 5,000,505 A | 3/1991 | Kawashita et al. | |
| 5,636,884 A | 6/1997 | Ladetto et al. | |
| 5,911,465 A | 6/1999 | Yamamoto et al. | |
| 5,951,106 A | 9/1999 | Hirama et al. | |
| 6,129,405 A * | 10/2000 | Miyahara | B60N 2/01 296/65.03 |
| 6,145,910 A * | 11/2000 | Baldas | B60N 2/01583 248/503.1 |
| 6,168,234 B1 | 1/2001 | Haynes et al. | |
| 6,457,765 B1 | 10/2002 | Bergquist et al. | |
| 6,666,514 B2 | 12/2003 | Muraishi et al. | |
| 6,981,746 B2 | 1/2006 | Chung et al. | |
| 7,108,325 B2 | 9/2006 | Williamson et al. | |
| 7,357,451 B2 | 4/2008 | Bendure et al. | |
| 7,380,859 B2 * | 6/2008 | Gardiner | B60N 2/01 296/64 |
| 7,441,822 B1 | 10/2008 | Day | |
| 7,516,999 B2 * | 4/2009 | Toyota | B60N 2/3011 296/65.05 |

(Continued)

FOREIGN PATENT DOCUMENTS

EP 3150426 A1 4/2017

*Primary Examiner* — Kiran B Patel
(74) *Attorney, Agent, or Firm* — David Coppiellie; Price Heneveld LLP

(57) ABSTRACT

A network of rails for a vehicle includes lateral rails that extend primarily along a lateral axis of the vehicle, longitudinal rails that extend primarily along a longitudinal axis of the vehicle, and a circular rail that is positioned at a junction between the lateral rails and the longitudinal rails.

20 Claims, 5 Drawing Sheets

(56) References Cited

U.S. PATENT DOCUMENTS

| | | | |
|---|---|---|---|
| 7,591,498 B2* | 9/2009 | Busha | B60N 3/101 |
| | | | 296/24.34 |
| 7,658,258 B2 | 2/2010 | Denney | |
| 7,712,829 B2* | 5/2010 | Park | B60N 2/01 |
| | | | 296/65.13 |
| 7,950,740 B2 | 5/2011 | Bunea et al. | |
| 8,182,014 B2* | 5/2012 | Mabuchi | B60N 2/01 |
| | | | 296/64 |
| 8,596,720 B2* | 12/2013 | Ootsuka | B60N 2/0296 |
| | | | 296/65.11 |
| 8,801,101 B2* | 8/2014 | Dagcioglu | B60N 2/3011 |
| | | | 296/65.09 |
| 9,114,730 B1 | 8/2015 | Hudson et al. | |
| 9,126,505 B2* | 9/2015 | Moriyama | B60N 2/01 |
| 9,358,904 B1* | 6/2016 | Muto | B60N 2/0732 |
| 9,463,715 B1* | 10/2016 | Rawlinson | B60N 2/0248 |
| 9,623,775 B2* | 4/2017 | Kanai | B60N 2/06 |
| 9,855,862 B2* | 1/2018 | Supernavage | B60N 2/3097 |
| 10,005,376 B2* | 6/2018 | Supernavage | B60N 2/32 |
| 10,040,373 B2* | 8/2018 | Rawlinson | B60N 2/14 |
| 10,486,558 B1* | 11/2019 | Baccouche | B60N 2/146 |
| 10,513,203 B2* | 12/2019 | Ito | B60N 2/0705 |
| 10,569,667 B2* | 2/2020 | Mihara | G01G 19/4142 |
| 2002/0021016 A1* | 2/2002 | Bergquist | B60N 2/01 |
| | | | 296/65.09 |
| 2009/0195037 A1 | 8/2009 | Plavetich et al. | |
| 2010/0270822 A1* | 10/2010 | Fujitsuka | B60N 2/073 |
| | | | 296/65.13 |
| 2011/0068226 A1* | 3/2011 | Baatz | B64C 1/20 |
| | | | 244/118.6 |
| 2012/0030924 A1* | 2/2012 | Kilibarda | B62D 65/024 |
| | | | 29/525.01 |
| 2016/0311343 A1* | 10/2016 | Mildner | B60N 2/0732 |
| 2019/0126783 A1* | 5/2019 | Baccouche | B60N 2/06 |
| 2019/0126784 A1* | 5/2019 | Dry | B60N 2/14 |
| 2019/0126786 A1* | 5/2019 | Dry | B60N 2/01 |
| 2019/0263295 A1* | 8/2019 | Dry | B60N 2/062 |

* cited by examiner

US 10,773,612 B2

NETWORK OF RAILS FOR A VEHICLE

FIELD OF THE INVENTION

The present disclosure generally relates to a network of rails. More specifically, the present disclosure relates to a network of rails for a vehicle.

BACKGROUND OF THE INVENTION

Vehicles are often provided with seating assemblies that can be adjusted for occupant comfort. Some seating assemblies in vehicles are capable of translation in fore-aft or side-to-side directions. However, there is a need for reconfigurable seating assemblies in vehicles that are capable of translation to various locations within a cabin of the vehicle.

SUMMARY OF THE INVENTION

According to a first aspect of the present invention, a network of rails for a vehicle includes lateral rails that extend primarily along a lateral axis of the vehicle, longitudinal rails that extend primarily along a longitudinal axis of the vehicle, and a circular rail that is positioned at a junction between the lateral rails and the longitudinal rails.

Embodiments of the first aspect of the invention can include any one or a combination of the following features:
  the circular rail bisects the lateral rails and the longitudinal rails at the junction between the lateral rails and the longitudinal rails;
  the lateral rails, the longitudinal rails, and the circular rail are in a generally planar relationship with one another,
  a diameter of the circular rail generally corresponds with a distance between the lateral rails and a distance between the longitudinal rails;
  the network of rails for a vehicle further including a seating assembly coupled to the network of rails;
  the seating assembly being coupled to the network of rails by a plurality of anchors that are positioned to permit actuation along the lateral rails, the longitudinal rails, and the circular rail;
  the plurality of anchors are positioned to permit actuation along the lateral rails, the longitudinal rails, and the circular rail without adjusting a longitudinal position or a lateral position of the plurality of anchors relative to one another,
  the plurality of anchors are coupled to an underside of a pair of seat tracks; and
  the pair of seat tracks enable horizontal actuation of the seating assembly along the seat tracks relative to the plurality of anchors.

According to a second aspect of the present disclosure, a network of rails for a vehicle includes lateral rails that extend primarily along a lateral axis of the vehicle, longitudinal rails that extend primarily along a longitudinal axis of the vehicle, and a circular rail positioned in a bisecting relationship at a junction of the lateral rails and the longitudinal rails.

Embodiments of the second aspect of the present disclosure can include any one or a combination of the following features:
  the lateral rails, the longitudinal rails, and the circular rails are in a generally planar relationship with one another,
  a diameter of the circular rails generally corresponds with a distance between the lateral rails and a distance between the longitudinal rails;
  the network of rails for a vehicle further including a seating assembly coupled to the network of rails;
  the seating assembly being coupled to the network of rails by a plurality of anchors that are positioned to permit actuation along the lateral rails, the longitudinal rails, and the circular rail;
  the plurality of anchors are positioned to permit actuation along the lateral rails, the longitudinal rails, and the circular rails without adjusting a longitudinal position or a lateral position of the plurality of anchors relative to one another,
  the plurality of anchors are coupled to an underside of a pair of seat tracks; and
  the pair of seat tracks enable horizontal actuation of the seating assembly along the seat tracks relative to the plurality of anchors.

According to a third aspect of the present disclosure, a network of rails for a vehicle includes lateral rails extending along a lateral axis of the vehicle, longitudinal rails extending along a longitudinal axis of the vehicle, a circular rail positioned in a bisecting relationship at a junction of the lateral rails and the longitudinal rails, and a seating assembly coupled to the network of rails by a plurality of anchors that are positioned to permit actuation along the network of rails.

Embodiments of the third aspect of the present disclosure can include any one or a combination of the following features:
  a diameter of the circular rails generally corresponds with a distance between the lateral rails, a distance between the longitudinal rails, and a distance between the plurality of anchors; and
  the plurality of anchors are positioned to permit actuation along the lateral rails, the longitudinal rails, and the circular rails without adjusting a longitudinal position or a lateral position of the plurality of anchors relative to one another.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
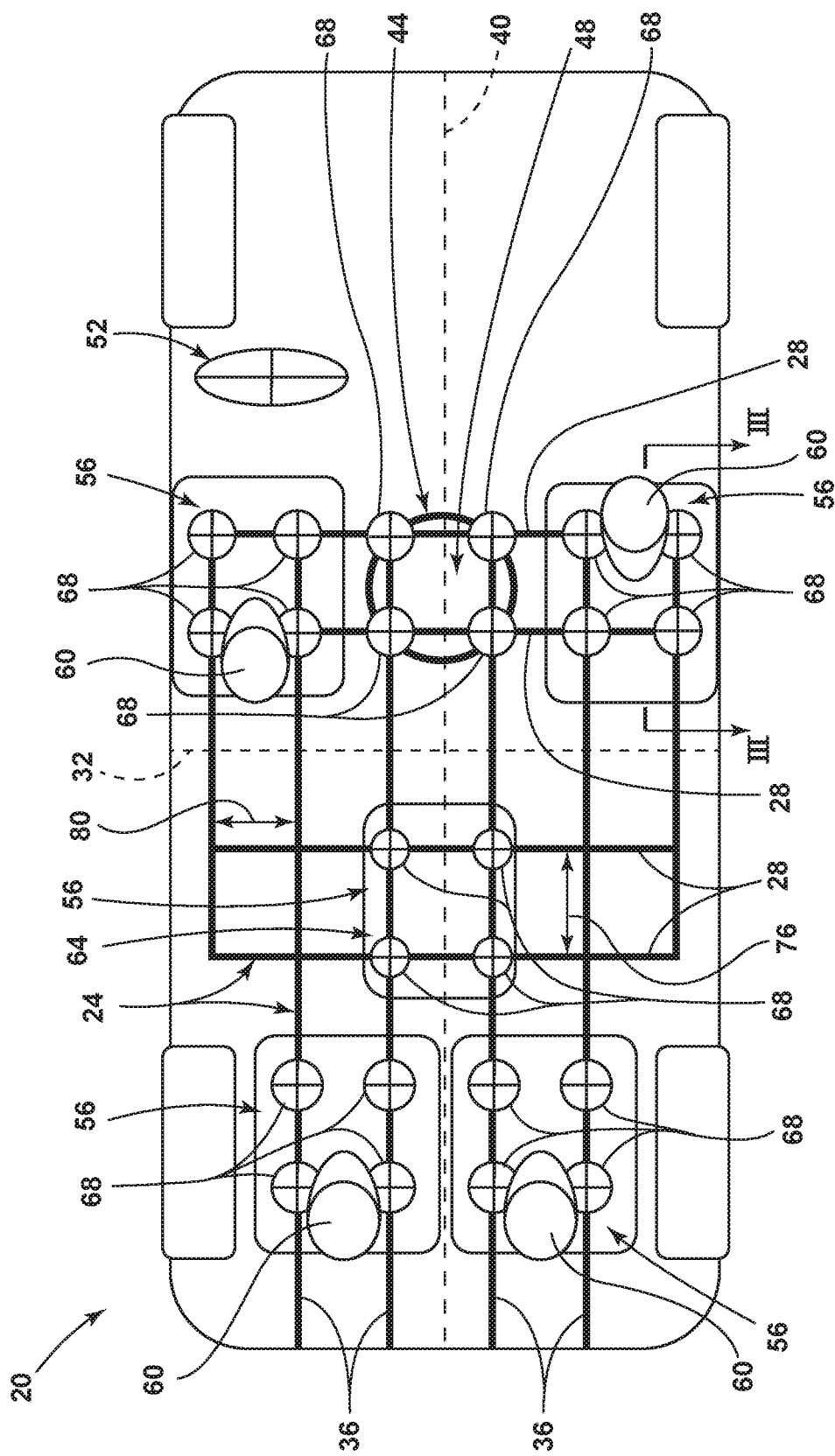
FIG. 1 is a top view of an interior of a vehicle, illustrating a network of rails, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a network of rails for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-5, a vehicle is generally designated by numeral 20. A network of rails 24 for the vehicle 20 includes lateral rails 28 that extend primarily along a lateral axis 32 of the vehicle 20. The network of rails 24 also includes longitudinal rails 36 that extend primarily along a longitudinal axis 40 of the vehicle 20. The network of rails 24 may further include a circular rail 44 that is positioned at a junction 48 between the lateral rails 28 and the longitudinal rails 36. In some examples, the circular rail 44 may be positioned at an end of one of the lateral or longitudinal rails 28, 36.

Referring again to FIG. 1, the vehicle 20 may be passenger driven, semi-autonomous, fully autonomous, or any combination of user-controlled and automated. For example, the semi-autonomous example of the vehicle 20 may perform many or all-commuting functions (e.g., accelerating, braking, turning, signaling, etc.) independent of user interaction while the user maintains override control of the vehicle 20. Accordingly, in some examples, the vehicle 20 may be provided with a steering wheel 52 that is positioned proximate to one of a plurality of seating assemblies 56. The seating assemblies 56 may be configured to provide various functionality to an interior or cabin of the vehicle 20. For example, the seating assemblies 56 may be utilized to support a user 60 in a seated position. Additionally or alternatively, the seating assemblies 56 may be folded to provide an ottoman, a work surface, a table 64, or the like. The seating assemblies 56 are coupled to the network of rails 24. In various examples, the seating assemblies 56 are coupled to the network of rails 24 by a plurality of anchors 68. The anchors 68 can be positioned to permit actuation along the lateral rails 28, the longitudinal rails 36, and the circular rail 44. In some examples, the plurality of anchors 68 are positioned to permit actuation along the lateral rails 28, the longitudinal rails 36, and the circular rail 44 without adjusting a longitudinal position or a lateral position of the plurality of anchors 68 relative to one another. Said another way, the anchors 68 on an individual seating assembly 56, in some examples, may remain fixed relative to one another in the lateral and longitudinal directions. While the anchors 68 may be fixed relative to one another, that does not exclude the ability of the anchors to move within the network of rails 24 and/or be provided with components that are movable (e.g., rollers, wheels, locking pins, etc.), as will be discussed in more detail herein.

Referring further to FIG. 1, the lateral rails 28 and the longitudinal rails 36 connect with one another at an angle at the junctions 48. For example, the lateral rails 28 and the longitudinal rails 36 may meet at an angle of about ninety degrees (90°) to define the junctions 48. Alternatively, the lateral rails 28 and the longitudinal rails 36 may meet at angles that are greater than or less than about ninety degrees (90°) without departing from the concepts disclosed herein. The circular rail 44 can be positioned at one or more of the junctions 48 between the lateral and longitudinal rails 28, 36. In the depicted example, the circular rail 44 is positioned at one of the junctions between the lateral rails 28 and the longitudinal rails 36. By providing a singular circular rail 44 in the network of rails 24, a weight and package size of the network of rails 24 can be minimized while still providing the desirable functionality enabled by the circular rail 44. In general, the lateral rails 28, the longitudinal rails 36, and the circular rail 44 are in a generally planar relationship with one another. Said another way, the network of rails 24, which includes the lateral rails 28, the longitudinal rails 36, and the circular rail 44, are configured to have corresponding heights and thicknesses to enable smooth and seamless transfer of the seating assemblies 56 and their associated anchors 68 throughout the extent of the network of rails 24 without resulting in binding or sticking of the anchors 68 within the network of rails 24.

Referring still further to FIG. 1, actuation of one of the seating assemblies 56 along the network of rails 24 to the circular rail 44 will now be discussed in one specific, non-limiting, example. In a first example, transitioning one of the seating assemblies 56 from a front-facing position (e.g., the seating assembly 56 in the front driver's side location) to a rear-facing position (e.g., the seating assembly 56 in the front passenger's side location) can be accomplished by actuating the seating assembly 56 laterally along the lateral rail 28 toward the circular rail 44. Next, the seating assembly 56 can be halted at the junction 48 that contains the circular rail 44. At the junction 48 that has the circular rail 44, the circular rail 44 bisects the lateral rails 28 and the longitudinal rails 36. Accordingly, when the anchors 68 are properly positioned at the junction 48 having the circular rail 44, the anchors 68 may be transitioned from the lateral rail 28 to either the longitudinal rail 36 or the circular rail 44 with equal ease by actuating the seating assembly 56 either toward or along the longitudinal rail 36 or rotating the seating assembly 56 about a vertical axis defined by a center point of the circular rail 44. Once the seating assembly 56 has been transitioned to the circular rail 44, the seating assembly 56 can be rotated to the desired orientation about the vertical axis defined by the center point of the circular rail 44. The seating assembly 56, having a different rotational orientation, can then be transitioned to the lateral rails 28 on the opposite side of the circular rail 44 to complete the transition from forward-facing to rearward-facing and from the driver's side of the vehicle 20 to the passenger's side of the vehicle 20. Alternatively, the seating assembly 56 can be transitioned to the longitudinal rails 36 to assume another location within the vehicle 20. A diameter 72 of the circular rail 44 (see FIG. 2) generally corresponds with a distance 76 between the lateral rails 28 and a distance 80 between the longitudinal rails 36. Accordingly, as the anchors 68 transition between the lateral rails 28, the longitudinal rails 36, and the circular rail 44, binding or catching of the anchors 68 at the junctions 48 is avoided, thereby providing a smooth operation and actuation of the seating assemblies 56 along the network of rails 24 to a variety of seating positions and seating orientations. It is contemplated that the angular orientation of the lateral rails 28, the longitudinal rails 36, and the circular rail 44 may have an impact on the rotational orientations of the seating assemblies 56 that can successfully transition between the entirety of the network of rails 24. For example, in the depicted example, the seating assemblies 56 may be limited to rotational orientations that are separated by about ninety degrees (90°) to ensure proper alignment of the anchors 68 with the lateral and longitudinal rails 28, 36.

Figure 2:
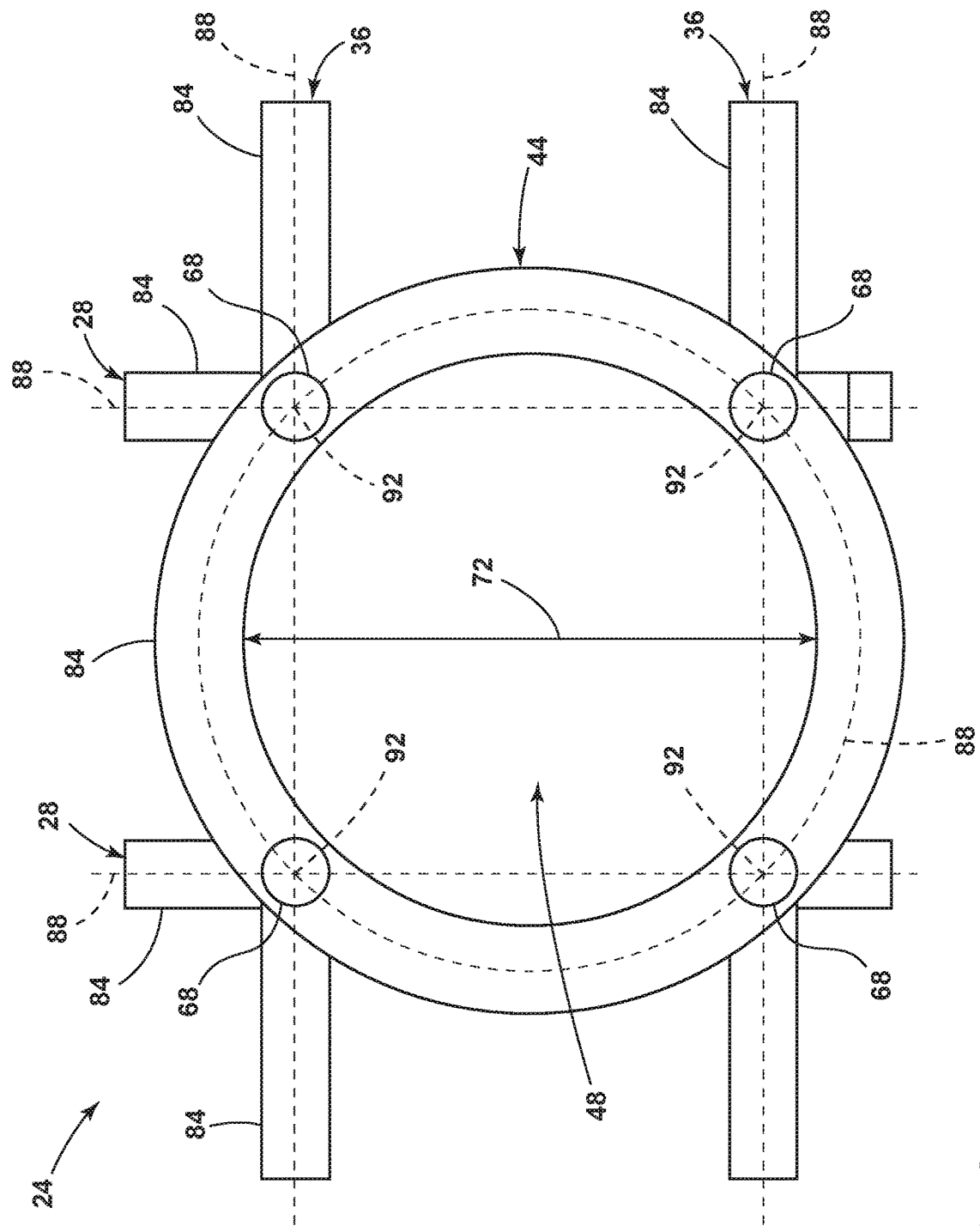
FIG. 2 is a top view of a junction between lateral rails, longitudinal rails, and a circular rail of the network of rails, according to one example.

Referring now to FIG. 2, the junction 48 where the lateral rails 28, the longitudinal rails 36, and the circular rail 44 interact with one another is shown. In various examples, the lateral rails 28 and the longitudinal rails 36 intersect or bisect one another at an angle. For example, the lateral rails 28 and the longitudinal rails 36 can intersect at an angle that is greater than about zero degrees (0°), greater than about fifteen degrees (15°), greater than about thirty degrees (30°), greater than about forty five degrees (45°), greater than about sixty degrees (60°), about ninety degrees (90°), at least about ninety degrees (90°), less than about one-hundred-twenty degrees (120°), less than about one-hundred-eighty degrees (180°), and/or combinations or ranges thereof, including individual values. As stated above, it is contemplated that the angular relationship or orientation of the lateral rails 28, the longitudinal rails 36, and/or the circular rail 44 can have an impact on which angular orientations of the seating assembly 56 (FIG. 1) can successfully transition between each of the lateral rails 28 and the longitudinal rails 36. Additionally, the angular relationship or orientation of the lateral rails 28 and the longitudinal rails 36 can affect the positioning of the anchors 68. In the depicted example, the lateral rails 28 and the longitudinal rails 36 are arranged with an angular orientation relative to one another of about ninety degrees (90°) and a spacing between individual tracks 84 of the lateral rails 28 and the longitudinal rails 36 is maintained at about equivalent distances. Accordingly, the anchors 68 can be positioned as an appropriately sized square such that the anchors 68 can transition, without lateral or longitudinal adjustment, between the lateral rails 28 and the longitudinal rails 36. Additionally, the diameter 72 of the circular rail 44 is sized such that the anchors 68 can transition into and out of the circular rail 44 from the lateral rails 28 and the longitudinal rails 36 without lateral or longitudinal adjustment of the anchors 68 relative to one another. In examples where the angular orientation or relationship of the lateral rails 28 and the longitudinal rails 36 are greater than or less than about ninety degrees (90°), the spacing of the anchors 68 relative to one another may take on alternative geometries to the square geometry described above. Additionally or alternatively, in examples where the angular orientation or relationship of the lateral rails 28 and the longitudinal rails 36 are greater than or less than about ninety degrees (90°), the anchors 68 may be provided with an ability to adjust their position relative to one another in the lateral and longitudinal directions to facilitate transitions of the seating assembly 56 between the lateral rails 28, the longitudinal rails 36, and the circular rail 44. It is contemplated that in examples where the angular orientation or relationship of the lateral rails 28 and the longitudinal rails 36 are greater than or less than about ninety degrees (90°), the circular rail 44 may be provided as an oblong geometry or another generally circular or angular geometry that is capable of facilitating the transitions between the lateral rails 28 and the longitudinal rails 36 while maintaining the functionality of enabling rotation of the seating assembly 56 about the vertical axis. Regardless of the angular orientation of the lateral rails 28 relative to the longitudinal rails 36, it can be beneficial for a centerline 88 of the widths of the individual tracks 84 of the lateral rail 28, the longitudinal rail 36, and the circular rail 44 to intersect with one another at the junction 48 such that the anchors 68 can transition along the entirety of the network of rails 24. The points at which the centerlines 88 of the widths of the individual tracks 84 of the lateral rails 28, the longitudinal rails 36, and the circular rail 44 intersect with one another may be referred to as convergence points 92.

Figure 3:
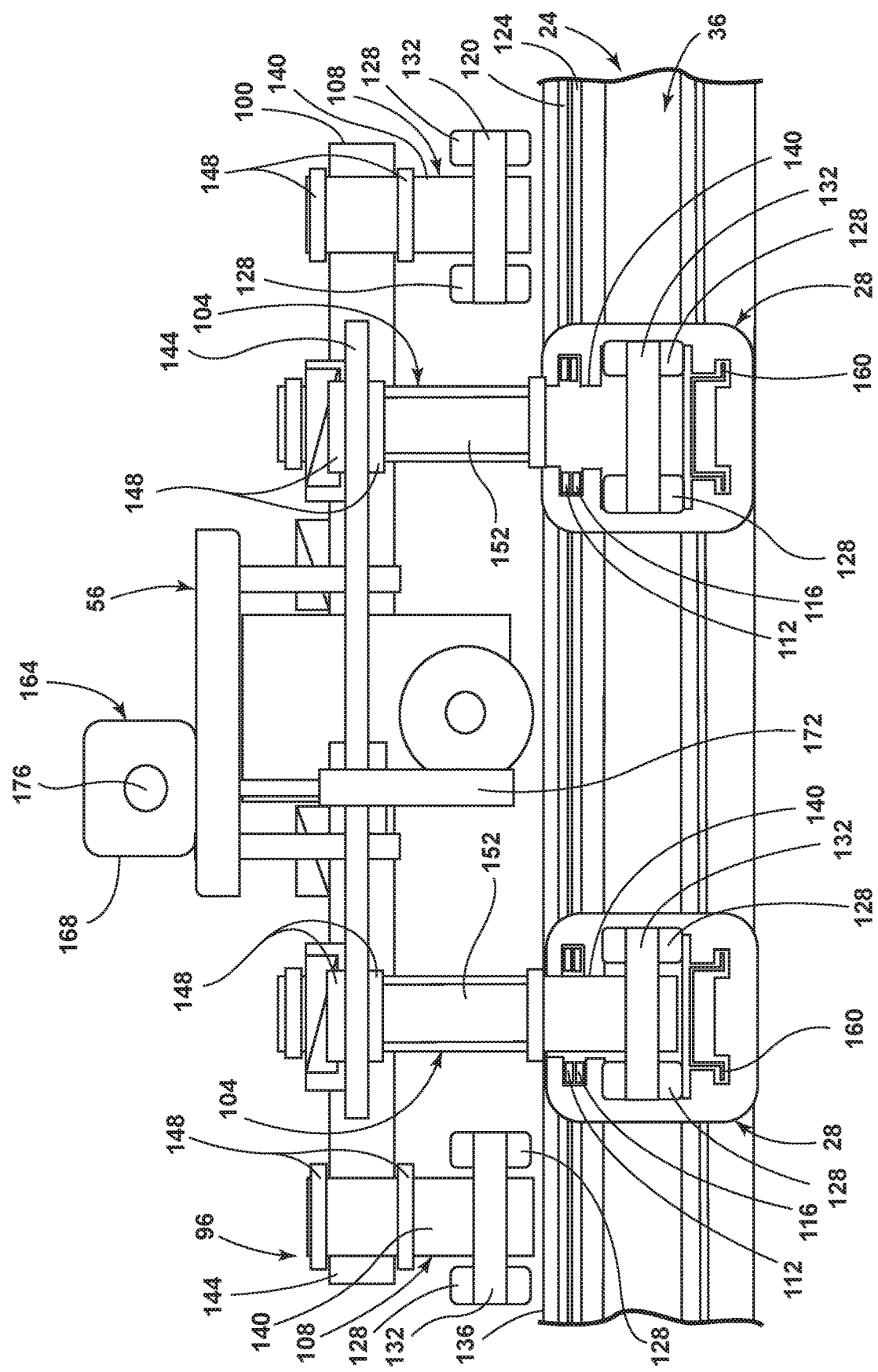
FIG. 3 is a cross-sectional view of the network of rails, taken at line III-III of FIG. 1, according to one example.
Figure 4:
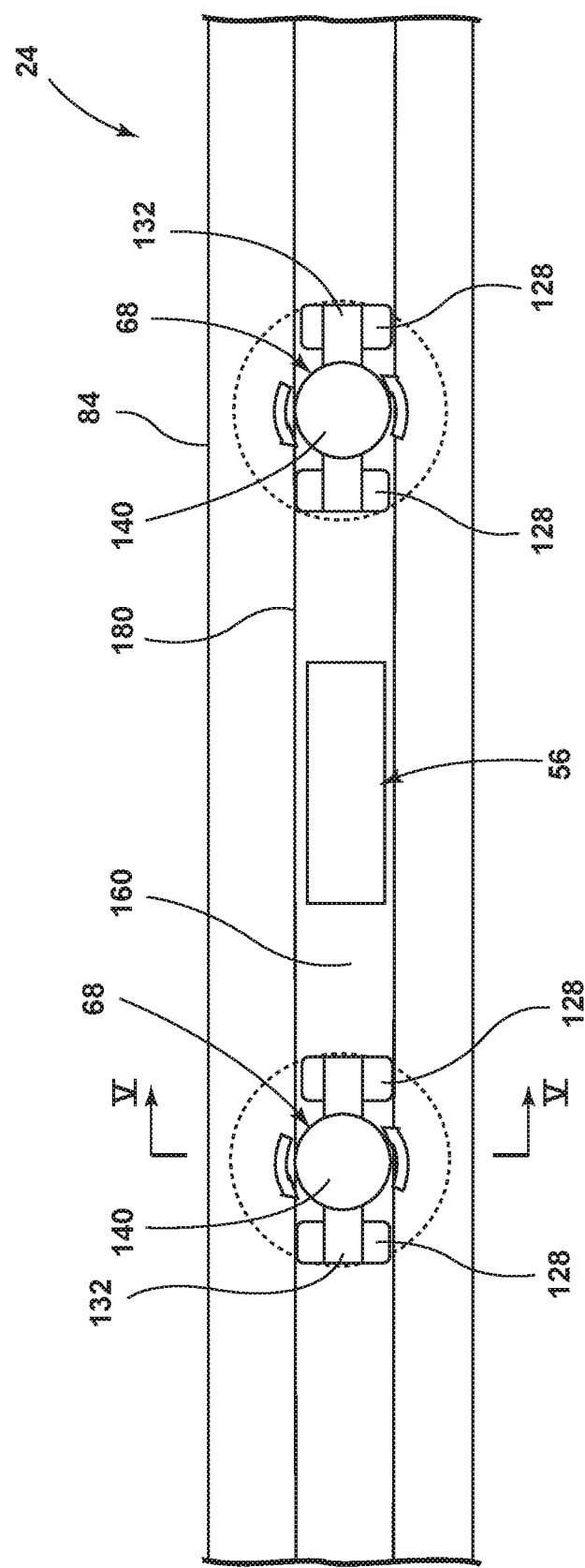
FIG. 4 is a top view of an individual track of the network of rails, illustrating an engagement of anchors with the individual track, according to one example.
Figure 5:
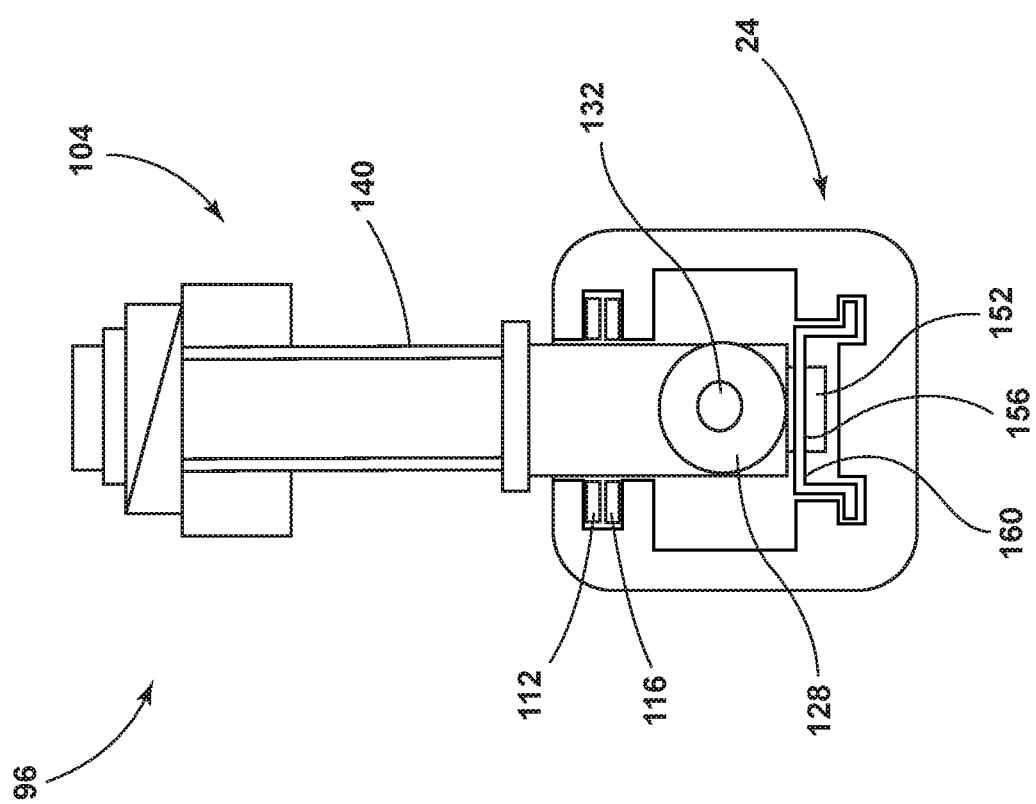
FIG. 5 is a cross-sectional view of one of the individual tracks, taken along line V-V of FIG. 4, according to one example.

Referring to FIGS. 3-5, the seating assemblies 56 can be provided with an actuation carriage 96 coupled to an underside thereof. For example, the actuation carriage 96 may be coupled to an underside of a pair of seat tracks 100 or the actuation carriage 96 may be coupled through the pair of seat tracks 100. The pair of seat tracks 100 can enable horizontal actuation of the seating assembly 56 along the seat tracks 100 relative to the anchors 68 without adjusting a lateral or longitudinal position of the anchors 68 within the network of rails 24. The plurality of anchors 68 can include active anchors 104 and passive anchors 108. The active anchors 104 are provided with power and data connections that can communicate with controllers and onboard computer modules to convey various information about the seating assembly 56 (e.g., lateral position, longitudinal position, rotational position, occupancy status, comfort settings or preferences, various safety statuses, etc.) as well as provide power to various powered components that can be provided on the seating assemblies 56 (e.g., heating and ventilating of the seat assembly 56, seat adjustment motors, safety features, safety sensors, entertainment features, etc.). The power and data connections to the seating assemblies 56 can be facilitated by a power connector 112 and a data connector 116, respectively, that are provided on one or more of the active anchors 104. The power and data connectors 112, 116 are positioned and configured to engage with power sources 120 and data transmitters 124 that are provided in the network of rails 24. The power and data connectors 112, 116 are electrically coupled to the various components within the seating assemblies 56 that are powered and/or monitored. The active and passive anchors 104, 108 are each provided with rollers 128 that are positioned on either side of an axle 132 so as to allow the anchors 68 to roll along the network of rails 24 and/or along a floor surface 136 of the vehicle 20. The axle 132 is coupled to, and supported by, a post 140 that engages with the axle 132 in a generally perpendicular fashion.

Referring again to FIGS. 3-5, the active anchors 104 and/or the passive anchors 108 are configured to permit rotation of the post 140 about a vertical axis such that the rollers 128 can engage, and be oriented with, the lateral rails 28, the longitudinal rails 36, and the circular rail 44 as the seating assembly 56 traverses the network of rails 24. The rotation of the post 140 about the vertical axis can be facilitated by a hand-actuated control (e.g., lever) or a powered control (e.g., motor). In either instance, all or part of the anchor 68 can rotate about the vertical axis. The power and data connectors 112, 116 can circumferentially extend from an exterior surface of the post 140 such that the power and data connectors 112, 116 can engage with the power sources 120 and the data transmitters 124, respectively, independent of a rotational position of the active anchor 104. The anchors 68 can be engaged with a support structure 144. For example, the anchors 68 may be provided with a plurality of flanges 148 that bracket the support structures 144 such that the anchor 68 rotatably engages with the support structure 144 while also being retained to the support structure 144.

Referring further to FIGS. 3-5, the anchors 68 can be provided with a locking pin 152 that passes through the post 140. For example, the active anchors 104 can be provided with the locking pin 152 while the locking pin 152 is omitted from the passive anchors 108. The locking pin 152 can be selectively engaged with one of a plurality of pin apertures 156 that are provided in a lower portion 160 of the lateral rails 28, the longitudinal rails 36, and/or the circular rail 44. The locking pin 152 can be actuated between a raised position (unlocked) to a lowered position (locked). The actuation of the locking pin 152 can be accomplished by a hand-actuated control or a motorized control. For example, a pin actuation assembly 164 can include an actuation head 168 and an actuation arm 172. In use, an actuation coupler 176 can be activated by a user, a computer, or a controller to initiate vertical motion of the actuation head 168, which in turn transmits the vertical motion to the actuation arm 172, which can affect the desired vertical actuation (raising or lowering) of the locking pin 152. In one example, the actuation arm 172 can initiate vertical actuation or motion of the support structure 144 to which the active anchors 104 are coupled which can result in a corresponding raising or lowering of the locking pin 152 and/or the anchor 68. In some examples, raising and lowering of the anchor 68 and the locking pin 152 can be accomplished by separate assemblies. Additionally or alternatively, according to various examples, the pin actuation assembly 164 may be responsible for a rotation of the anchors 68 about the vertical axis. For example, the actuation head 168 may be rotated ninety degrees (90°) about the vertical axis to affect a corresponding ninety-degree (90°) rotation of the anchor 68, thereby adjusting the orientation of the rollers 128 to engage and be aligned with a perpendicularly oriented portion of the network of rails 24. Additionally, the rotation of the anchor 68 about the vertical axis can be utilized in engaging and disengaging the seating assemblies 56 from the network of rails 24. For example, the rollers 128 can be rotated about the vertical axis to be coaxially aligned with a slot 180 in an upper portion of the individual tracks 84 (see FIG. 4). In such an orientation, the rollers 128 can be removed from the network of rails 24 by removing the seating assembly 56 from the vehicle 20. Similarly, the seating assembly 56 can be installed in the vehicle 20 by inserting the rollers 128 through the slot 180 and affecting a ninety-degree (90°) rotation of the rollers 128 by rotating the anchor 68 such that the rollers 128 nest within the structure of the individual tracks 84. In some examples, the active anchors 104 and the passive anchors 108 are horizontally and/or vertically offset from one another. The horizontal and/or vertical offset of the active anchors 104 and the passive anchors 108 can allow the seating assembly 56 to traverse an interior of the vehicle 20 regardless of whether the anchors 68 are actively engaged with the network of rails 24.

The present disclosure provides a compact, weight-efficient network of rails 24 that enable lateral, longitudinal, and rotational actuation of seating assemblies 56 such that users are provided with greater freedom in the arrangement of the interior of the vehicle 20. Actuation of the seating assemblies 56 about the network of rails 24 can be accomplished by manual or powered movement. Additionally, the present disclosure provides seating assemblies 56 that can be rapidly installed, uninstalled, and transitioned or translated to various locations within the vehicle 20.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A network of rails for a vehicle, comprising:
   lateral rails that extend primarily along a lateral axis of the vehicle;
   longitudinal rails that extend primarily along a longitudinal axis of the vehicle; and
   a circular rail positioned at a junction between the lateral rails and the longitudinal rails.

2. The network of rails for a vehicle of claim 1, wherein the circular rail bisects the lateral rails and the longitudinal rails at the junction between the lateral rails and the longitudinal rails.

3. The network of rails for a vehicle of claim 1, wherein the lateral rails, the longitudinal rails, and the circular rail are in a generally planar relationship with one another.

4. The network of rails for a vehicle of claim 1, wherein a diameter of the circular rail generally corresponds with a distance between the lateral rails and a distance between the longitudinal rails.

5. The network of rails for a vehicle of claim 4, further comprising a seating assembly coupled to the network of rails.

6. The network of rails for a vehicle of claim 5, wherein the seating assembly is coupled to the network of rails by a plurality of anchors that are positioned to permit actuation along the lateral rails, the longitudinal rails, and the circular rail.

7. The network of rails for a vehicle of claim 6, wherein the plurality of anchors are positioned to permit actuation along the lateral rails, the longitudinal rails, and the circular rail without adjusting a longitudinal position or a lateral position of the plurality of anchors relative to one another.

8. The network of rails for a vehicle of claim 6, wherein the plurality of anchors are coupled to an underside of a pair of seat tracks.

9. The network of rails for a vehicle of claim 8, wherein the pair of seat tracks enable horizontal actuation of the seating assembly along the seat tracks relative to the plurality of anchors.

10. A network of rails for a vehicle, comprising:
    lateral rails that extend primarily along a lateral axis of the vehicle;
    longitudinal rails that extend primarily along a longitudinal axis of the vehicle; and
    a circular rail positioned in a bisecting relationship at a junction of the lateral rails and the longitudinal rails.

11. The network of rails for a vehicle of claim 10, wherein the lateral rails, the longitudinal rails, and the circular rails are in a generally planar relationship with one another.

12. The network of rails for a vehicle of claim 10, wherein a diameter of the circular rails generally corresponds with a distance between the lateral rails and a distance between the longitudinal rails.

13. The network of rails for a vehicle of claim 12, further comprising a seating assembly coupled to the network of rails.

14. The network of rails for a vehicle of claim 13, wherein the seating assembly is coupled to the network of rails by a plurality of anchors that are positioned to permit actuation along the lateral rails, the longitudinal rails, and the circular rail.

15. The network of rails for a vehicle of claim 14, wherein the plurality of anchors are positioned to permit actuation along the lateral rails, the longitudinal rails, and the circular rails without adjusting a longitudinal position or a lateral position of the plurality of anchors relative to one another.

16. The network of rails for a vehicle of claim 14, wherein the plurality of anchors are coupled to an underside of a pair of seat tracks.

17. The network of rails for a vehicle of claim 8, wherein the pair of seat tracks enable horizontal actuation of the seating assembly along the seat tracks relative to the plurality of anchors.

18. A network of rails for a vehicle, comprising:
    lateral rails extending along a lateral axis of the vehicle;
    longitudinal rails extending along a longitudinal axis of the vehicle;
    a circular rail positioned in a bisecting relationship at a junction of the lateral rails and the longitudinal rails; and a seating assembly coupled to the network of rails by a plurality of anchors that are positioned to permit actuation along the network of rails.

19. The network of rails for a vehicle of claim 18, wherein a diameter of the circular rails generally corresponds with a distance between the lateral rails, a distance between the longitudinal rails, and a distance between the plurality of anchors.

20. The network of rails for a vehicle of claim 18, wherein the plurality of anchors are positioned to permit actuation along the lateral rails, the longitudinal rails, and the circular rails without adjusting a longitudinal position or a lateral position of the plurality of anchors relative to one another.

\* \* \* \* \*